Jan. 25, 1955 B. BARENYI 2,700,570
MOTOR VEHICLE OF THREE-SECTION, SEPARABLY CONNECTED TYPE
Filed Dec. 21, 1949
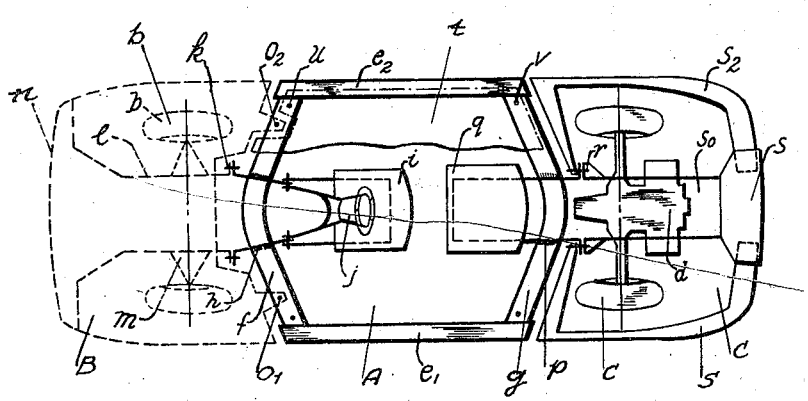
INVENTOR:
BELA BARENYI
By:
Haseltine, Lake & Co.
AGENTS

United States Patent Office 2,700,570
Patented Jan. 25, 1955

2,700,570

MOTOR VEHICLE OF THREE-SECTION, SEPARABLY CONNECTED TYPE

Béla Barényi, Stuttgart-Rohr, Germany

Application December 21, 1949, Serial No. 134,297

Claims priority, application Germany December 30, 1948

3 Claims. (Cl. 296—28)

The present invention relates to a motor vehicle and more particularly to such a one which is manufactured in sections in accordance with the cell system, that is, in which the end sections of the vehicle (or one end section) are manufactured separately from a center section and later attached thereto.

The weight of a motor vehicle depends a great deal on the ability of the vehicle to take up and pass along the forces appearing in the vehicle. The invention, accordingly, is based on the conception that it is of advantage to concentrate the main forces acting upon the vehicle as far as possible to certain structural parts where the forces partly compensate themselves or can be mutually absorbed or passed along. Although in this case it is necessary that this structural part is, in accordance with the increased stress, of heavier proportions, the remaining structural parts which are relatively slightly stressed may, to make up for this, be so much lighter in weight that a lesser total weight at the same safety factor with respect to the strength may be obtained. Furthermore, the forces are easier to control by concentrating them on a few structural parts than they would be if being effective on the entire vehicle.

In accordance with the invention, frame cross members, particularly a front and rear cross member of a center frame are used as such structural parts on which the main forces are concentrated. With regard to their location in the vehicle, these cross members are, on the one hand, particularly suitable to take up the main forces, and on the other hand they can be constructed to be sufficiently solid and rigid without demanding much material, and sufficiently strong by relatively short longitudinal frame members to form one well-braced frame rigid enough to withstand even severe stresses.

In application to motor vehicles which are manufactured in sections according to the cell system, as such cross members serving for the concentration of the forces are suitably arranged adjacent to the joints so that the individual vehicle sections can be joined to them.

Main forces are primarily considered to be weights and mass forces ensuing from statical loads, road shocks, propelling and braking forces. It is, therefore, an object of the invention to provide, as much as possible, a most direct support of the axle assemblies, power-unit and car body on the cross member, the end section, combined to one structural unit, being supported as an entirety on the adjacently situated frame cross member. But it is appropriate also to support the weight of the center section of the vehicle, hence, for example, the vehicle body and passenger seats as well as the steering mechanism and other appurtenant vehicle parts etc. as much as possible directly on the cross member. The cross members, moreover, are very suitable for attaching such devices as car jerks, towing agents or the like which put stresses on the frame from without.

The above and other objects and features of the invention will be apparent from the accompanying drawing in which one embodiment of the invention is illustrated diagrammatically by way of a plan view of a motor vehicle manufactured in sections in accordance with the cell system.

The illustrated vehicle consists of a center section (cell A) and of two end sections (cells B and C). The center section A of the vehicle contains the interior or passenger compartment of the vehicle body which is encircled by the annular frame $a$ forming at the same time the demarcation of the center section of the vehicle.

The front-end section B contains the front wheels $b$ guided by parallel links, for instance, the rear-end section C, the rear wheels $c$ mounted on oscillating axle shafts, for instance, and likewise the entire power-unit $d$ comprising engine and transmission.

The frame $a$ is essentially a hexagon and consists of the two longitudinal members $e_1$ and $e_2$ which are arranged at a distance from each other corresponding to the greatest width of the vehicle exceeding the tread width, and of the cross members $f$ and $g$ which are angularly shaped pointing toward the vehicle ends and arranged adjacent to the front dashboard and the rear panel of the passenger compartment, respectively. The longitudinal and cross members are suitably of the box-section type. The cross members appropriately extend through the longitudinal members and are welded thereto. The floor is appropriately connected to the longitudinal and cross members of the frame to form a supporting unit.

On both sides of its curved part, the front cross member $f$ is provided with reinforcing members $h$ forming, for example, vertical or if necessary box-like braced walls. On the rear ends of these members $h$ are mounted, the driver's seat $i$ and the steering wheel $j$, if occasion arises, together with instrument panel and gear shift control devices or the like. The foot pedals for operating the car are suitably mounted on the cross member in front of the driver's seat. On the forward ends of the members $h$ is mounted at $k$ a frame or support $l$ for the front-end section at a relatively short distance behind the suspension members $m$ of the front wheels, so that the forces and momentum ensuing from the roadway are as much as possible transmitted directly to the cross member. The body $n$ of the vehicle section B is, for example, fastened, on the one hand, on the frame or support $l$, and on the other hand at $o_1$ and $o_2$ directly on the cross member $f$.

Similar to the forward cross member $f$, the rear cross member $g$ also has staying members $p$ secured thereto which carry a seat $q$, and the rear ends $r$ of this member $q$ are adapted for mounting a frame or support $s$ which at the same time carries the vehicle body and consists of the lateral frame members $s_1$ and $s_2$ and of a center section $s_0$ accommodating the power-unit and axle assembly $d$ and the rear wheels $c$.

Framework $l$ and car body $n$ of the front-end section and framework $s$ and the car body of the rear-end section may, of course, also each be assembled into a self-supporting car body.

The car body $t$ of the center section (only partially shown) containing the passenger compartment may likewise be suitably supported on the cross members (for example, adjacent to the crossing of the longitudinal members at $u$ and $v$). But it may also form one unit with the frame $a$ or may be supported on the latter by means of separate longitudinal and cross members.

The other seats (not shown) are likewise suitably mounted on the frame $a$ particularly on the longitudinal and/or cross members thereof. The cross members, as far as possible, serve also directly as carrier for trunks to be stowed away in front of or behind the seats. Battery, tool chest and spare tire are likewise appropriately thus arranged—for example, in the front-end section—that their weight is directly supported on the cross members, or, in any case, on the structural parts fastened to the cross members, likewise the fuel tank which, in the embodiment shown, is preferably arranged in the rear section C.

Provision may also be made on the cross members $f$ and $g$ for applying car jacks or towing agents (towing cables or such like). Since the cross members are amply proportioned and therefore strong enough to take up the forces acting from the outside there is in this case usually no necessity for reinforcements.

In the form of the invention illustrated herein, front section B and rear section C are of different configuration. However, the same may also be built to be similar in shape. The individual features may also be interchanged at pleasure. Furthermore, the features of the invention are also applicable to vehicles in which only one end section is connected to the rest of the vehicle in accordance with the cell system of manufacture.

It will be obvious to those who are familiar with such matters that the details of construction may be varied from those shown by me and yet the essentials of the invention be retained. I therefore do not limit myself to such details.

What I claim is:

1. A three-sectioned, separable section motor vehicle including a first central supporting section defining a passenger space and comprising a unitary frame having two hollow transverse beams of a length substantially corresponding to the greatest width of the vehicle, at least one of said beams being bent outwardly of said frame to form an obtuse angle having its apex located in the central longitudinal plane of the vehicle, two longitudinal sills connecting the ends of said beams and a central body portion carried by said frame, and two second and third end sections each provided with an auxiliary unitary frame, with a pair of wheels, with guiding means attached to said auxiliary frame and said wheels for guiding said wheels for vertical movement relative to the auxiliary frame and with a body end portion, and vertical plates secured to each of said beams in a substantially longitudinal direction near to the apex thereof at a distance from each other of about one third of the whole length of the beam and projecting outwardly therefrom towards the adjacent end section, said auxiliary frames of said end sections being detachably secured to said plates by means of bolts, whereby the main forces acting on the vehicle in a longitudinal direction are transmitted to the central section by said vertical plates near to the apex of the transverse beams.

2. The combination claimed in claim 1 in which at least one passenger seat, located within the passenger space of said central section, is secured to the plates on one of said transverse beams.

3. The combination claimed in claim 1 in which a steering column with a steering wheel is secured to the plates on the transverse beam located in front of the unitary frame of the central supporting section.

References Cited in the file of this patent

UNITED STATES PATENTS

| | | |
|---|---|---|
| 1,313,429 | Lenfestey | Aug. 19, 1919 |
| 1,806,523 | de Vizcaya | May 19, 1931 |
| 2,111,563 | Kliesrath | Mar. 22, 1938 |
| 2,128,930 | Fageol et al. | Sept. 6, 1938 |
| 2,139,750 | Hicks | Dec. 13, 1938 |
| 2,425,948 | Lucien | Aug. 19, 1947 |
| 2,551,528 | Darrin | May 1, 1951 |

FOREIGN PATENTS

| | | |
|---|---|---|
| 476,100 | Great Britain | Dec. 1, 1937 |
| 601,189 | Germany | Aug. 10, 1934 |
| 883,110 | France | Mar. 15, 1943 |
| 884,981 | France | May 17, 1943 |